(12) United States Patent
Ragozin et al.

(10) Patent No.: US 9,928,638 B2
(45) Date of Patent: *Mar. 27, 2018

(54) GRAPHICAL SIMULATION OF OBJECTS IN A VIRTUAL ENVIRONMENT

(71) Applicant: Intel Corporation, Santa Clara, CA (US)

(72) Inventors: Dmitry Ragozin, Nizhny Novgorod (RU); Alexander Shokin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/066,698

(22) Filed: Mar. 10, 2016

(65) Prior Publication Data

US 2016/0196682 A1    Jul. 7, 2016

Related U.S. Application Data

(63) Continuation of application No. 13/505,981, filed as application No. PCT/RU2009/000726 on Dec. 25, 2009, now Pat. No. 9,308,444.

(51) Int. Cl.
    *G06T 15/00* (2011.01)
    *A63F 13/577* (2014.01)
    (Continued)

(52) U.S. Cl.
    CPC ............ *G06T 15/005* (2013.01); *A63F 13/10* (2013.01); *A63F 13/25* (2014.09); *A63F 13/577* (2014.09);
    (Continued)

(58) Field of Classification Search
    USPC ................................. 345/419, 473, 501, 619
    See application file for complete search history.

(56) References Cited

U.S. PATENT DOCUMENTS 6,708,142 B1    3/2004  Baillot
7,616,835 B2   11/2009  Lobregt
(Continued)

FOREIGN PATENT DOCUMENTS

CN    1653487    6/2005
CN    1761974    4/2006
(Continued)

OTHER PUBLICATIONS

Gareau A., et al., "A Particle System Using CSG for Description and Visualization", Computer Animation '94., Proceedings of Geneva, Switzerland May 25-28, 1994, Los Alamitos, CA, USA, IEEE Comput. Soc Lnkd—DOI:101109/CA. 1994.323993, May 25, 1994, pp. 175-183, XP010099673, ISBN: 978-0-8186-6240-9.

(Continued)

*Primary Examiner* — Kimbinh T Nguyen
(74) *Attorney, Agent, or Firm* — Womble Bond Dickinson (US) LLP

(57) ABSTRACT

A method for simulating a graphical object. The method comprises monitoring approximate distance between a first graphical object and a second graphical object, the first graphical object having at least a first particle and the second graphical object having at least a second particle; detecting a collision (P220) between the first particle and the second particle; computing (P230) a first set of forces associated with the first and second particles due to the collision, wherein the first set of forces are computed within a first context in which X particle attributes associated with the first and second particles are considered; computing (P240) a second set of forces associated with the first and second particles due to the collision, wherein the second set of forces are computed within a second context in which Y particle attributes associated with the first and second particles are considered, wherein X<Y.

20 Claims, 6 Drawing Sheets

(51) Int. Cl.
*A63F 13/40* (2014.01)
*G06T 13/20* (2011.01)
*A63F 13/25* (2014.01)
*G06T 1/20* (2006.01)

(52) U.S. Cl.
CPC ............... *G06T 1/20* (2013.01); *G06T 13/20* (2013.01); *A63F 2300/64* (2013.01); *G06T 2210/56* (2013.01)

(56) References Cited

U.S. PATENT DOCUMENTS

| 8,666,712 B2 | 3/2014 | Bleiweiss et al. |
| 2005/0212806 A1 | 9/2005 | Koselj et al. |
| 2009/0021518 A1 | 1/2009 | Harada |
| 2009/0251469 A1* | 10/2009 | Cohen ..................... G06T 13/20 345/473 |

FOREIGN PATENT DOCUMENTS

| CN | 101286188 A | 10/2006 |
| CN | 101329772 | 12/2006 |
| CN | 1996396 A | 7/2007 |
| CN | 101404039 A | 4/2009 |
| CN | 101542487 | 9/2009 |

OTHER PUBLICATIONS

David Tonnesen, "Spatially Coupled Particle Systems", SIGGRAPH '92 Course 16 notes: Particle Systems Modeling, Animation, and Physically Based Techniques, May 1992 (May 1992), pp. 1-20, XP002607579, retrieved from the internet: URL:http://www.dgp.toronto.edu/(davet/papers/siggraph92course/siggraph-92-course-A.

Aleksey Bader, et al., "Game Physics Performance on the Larrabee Architecture", 2008, pp. 1-9, XP002607580, retrieved from the Internet:URL:http://software.intel.com/file/15395/%22%3EGamePhysicsOnLarrabee_paper.pdf.

PCT Search Report, PCT/RU2009/000726, Int. Filing Date Dec. 25, 2009, Applicant Intel Corporation, European Patent Office Searching Authority.

Search Report from counterpart Chinese Patent Application No. 201510119695X, dated Apr. 21, 2017, 2 pages.

* cited by examiner

```
struct Body {
    float position[3];
    float velocity[3];
    float acceleration[3];
    float angular_position[3];
    float angular_velocity[3];
    float angular_acceleration[3];
    Sphere** spheres;
    float* particles_radius;
    unsigned int num_of_particles;
}
```

*FIG. 4A*

```
struct Sphere {
    float position[3];
    float velocity[3];
    float acceleration[3];
    Body* owner;
}
```

*FIG. 4B*

```
while (true) {
    collision_detection();
    compute_forces();
    integration();
    update_grid();
}
```

*FIG. 4C*

```
Body::integration() {
    compute_angular_inertia(I);
    compute_accelerations();

angular_acceleration/=I;
    acceleration/=num_of_particles;

integrate();
    update_sphere_pos_vel();
}
```

*FIG. 4D*

GRAPHICAL SIMULATION OF OBJECTS IN A VIRTUAL ENVIRONMENT

CROSS-REFERENCE TO RELATED APPLICATION

The present application is a continuation of prior U.S. patent application Ser. No. 13/505,981, filed Jul. 31, 2012, entitled "GRAPHICAL SIMULATION OF OBJECTS IN A VIRTUAL ENVIRONMENT," by Ragozin, et al., which is a United States National Phase Application under 35 U.S.C. § 371 of International Application No. PCT/RU2009/000726, filed Dec. 25, 2009, entitled "GRAPHICAL SIMULATION OF OBJECTS IN A VIRTUAL ENVIRONMENT," the priority of which is hereby claimed and the contents of which are hereby incorporated by reference herein.

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present disclosure relates generally to simulation engines, and, more particularly, to graphically simulating a physical object in a virtual environment.

BACKGROUND

A graphics simulation engine refers to a software application that may be used to graphically simulate physical models or objects in a virtual environment. A simulation engine may simulate and predict physical changes to a graphically rendered object under different conditions to approximate events and effects as if the object was a real object subject to real world forces and laws of physics.

Existing simulation engines may represent a physical object either as a collection of simple or complex particles. A simple particle lacks spatial extension, in that a simple particle is a representation of a graphical particle where changes to the particle's size, shape and structure are irrelevant in a given presentation context. Thus, a simple particle is generally limited to supporting movements for non-deformable objects in three spatial directions (i.e., three degrees of freedom). A non-deformable object refers to an object where the distance between any two given particles in the object remains constant in time regardless of external forces exerted on the object.

A complex particle, in contrast, may be used to represent an object of finite size which may be deformable or non-deformable. A deformable object refers to an object where the distance between any two given particles in the object may change in time with regard to external forces exerted on the object. A complex particle occupies space and is generally implemented to support rotating in three spatial directions in addition to movements in three spatial directions (i.e. six degrees of freedom).

Due to the differences between a complex particle and a simple particle, collision related computations directed to complex particle simulation are significantly more complex as compared to the computations for simple particle simulation. Also, in complex particle simulation, the accuracy of collision detection or other parameters may decrease as the number of complex particles increases.

BRIEF DESCRIPTION OF THE DRAWINGS

Embodiments of the claimed subject matter are understood by referring to the figures in the attached drawings, as provided below.

FIGS. 4A through 4D illustrates exemplary pseudo codes for physical object simulation in a computing environment, in accordance with one or more embodiments.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

For the purpose of summarizing, certain aspects, advantages, and novel features of the claimed subject matter have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method for simulating a graphical object in a multi-dimensional virtual space is provided. The method comprises monitoring approximate distance between a first graphical object and a second graphical object. The first graphical object may have at least a first particle and the second graphical object may have at least a second particle. The method may further comprise detecting a collision between the first particle and the second particle and computing a first set of forces associated with the first and second particles due to the collision. The first set of forces are computed within a first context in which X particle attributes associated with the first and second particles are considered. A second set of forces associated with the first and second particles due to the collision are also computed. The second set of forces are computed within a second context in which Y particle attributes associated with the first and second particles are considered, wherein $X<Y$. Position and orientation of particles may be computed in the first and second graphical objects after the collision based on computation results for the first and second set of forces.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

Figure 1A:
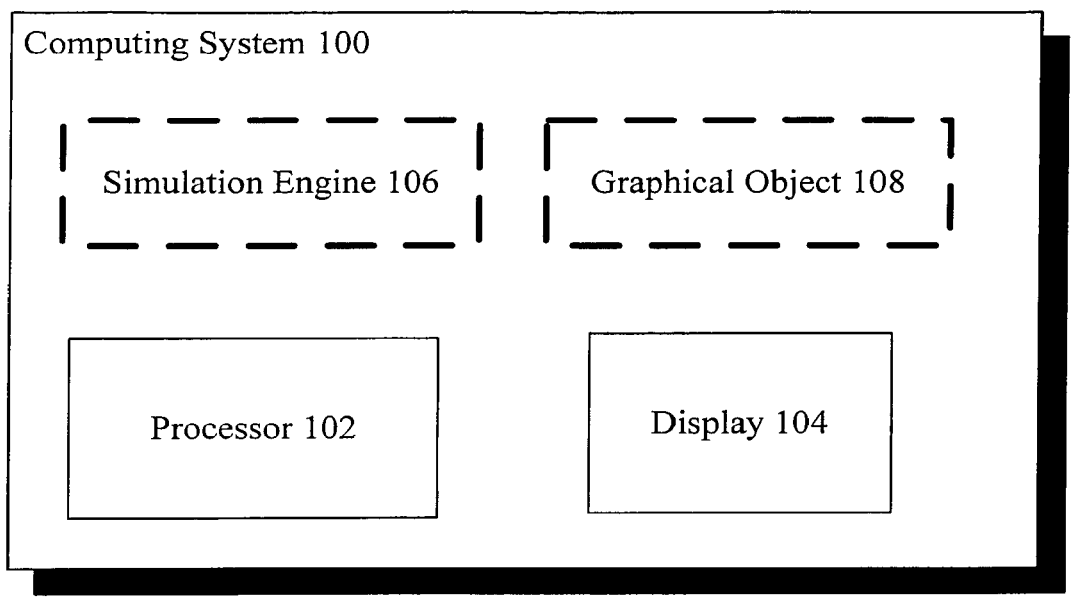
FIG. 1A is an exemplary block diagram of a computing system in which a physical object may be graphically rendered using a simulation engine.

Referring to FIG. 1A, in accordance with one embodiment, an exemplary computing system 100 comprises a processor 102 and a display 104. The processor 102 may be a central processing unit (CPU), a graphics processing unit (GPU), or other type of microcontroller capable of executing a simulation engine 106. The display 104 may be a cathode ray tube (CRT) monitor, a liquid crystal display (LCD) or other type of device capable of graphically rendering one or more graphical objects 108 in a multi-dimensional virtual environment.

Figure 1B:
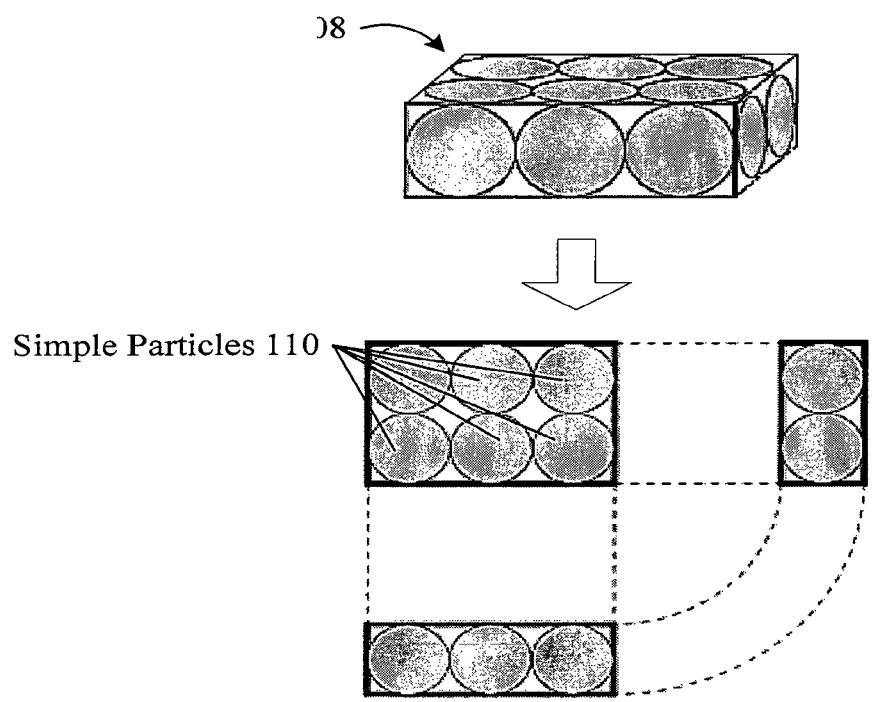
FIG. 1B is a block diagram of an exemplary object graphically simulated based on a collection of graphical particles, in accordance with one embodiment.

Referring to FIG. 1B, a graphical object 108 may be approximated as a complex particle comprising a set of, optionally identical, simple particles, as shown. The relative positions of the simple particles may be fixed to preserve the original physical properties of the graphical object 108 for a wide variety of shapes. For example, if the graphical object 108 is brick-shaped, the positions of the simple particles may be fixed according to the particular shape. Depending on implementation, the number and relative positions of the simple particles may be determined based on shape, size or other physical properties of the graphical object 108.

A graphical object 108 may be used to represent deformable or non-deformable objects. That is, a graphical object 108 may be a representation of an object that may be dented, destroyed or damaged upon colliding with another object. In some embodiments, graphical objects may represent resilient objects that are deformed as the result of a collision and are then reformed back to approximately the original shape.

Figure 2:
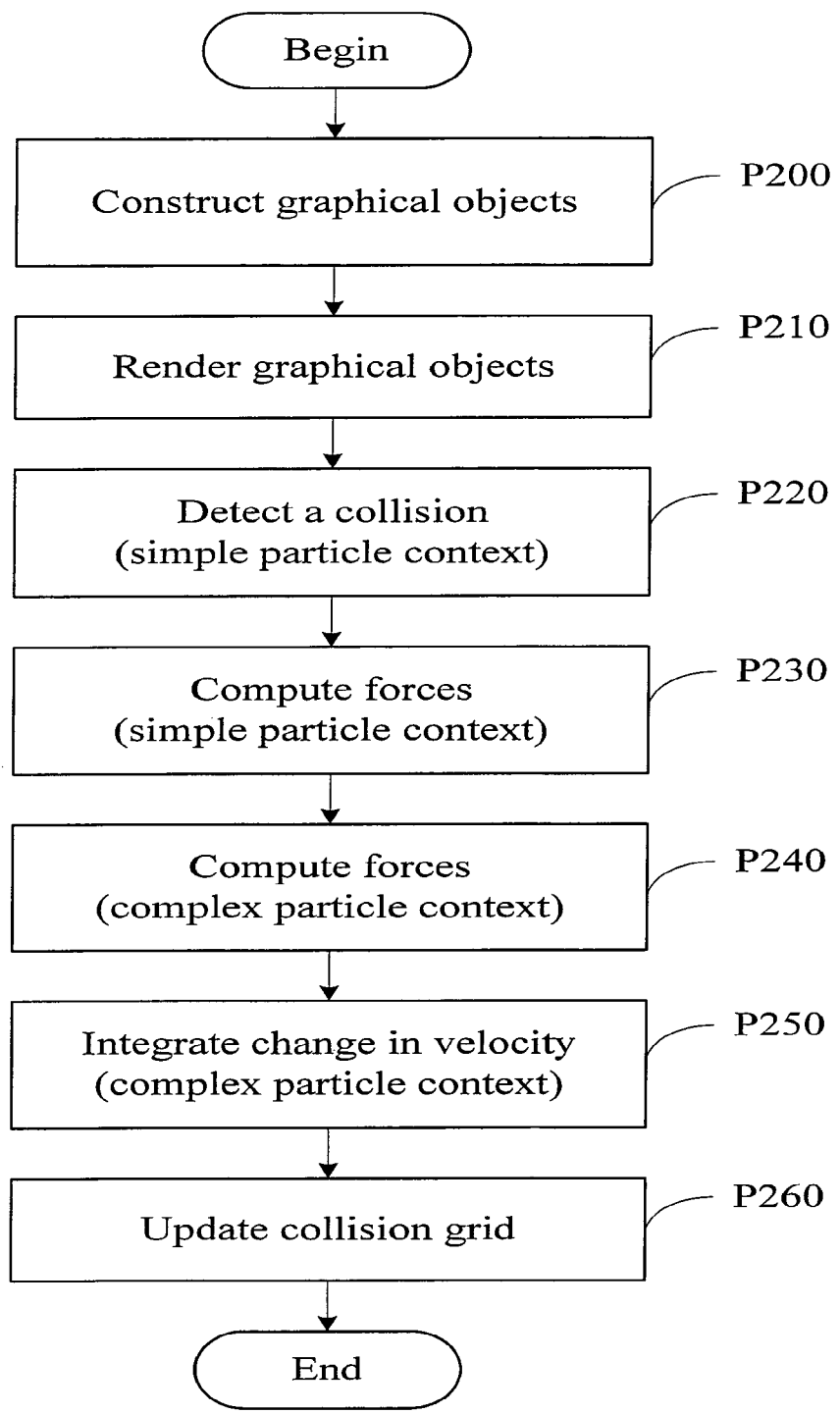
FIG. 2 is a flow diagram of an exemplary method for graphical object simulation, in accordance with one embodiment.

Referring to FIGS. 1A, 1B and 2, in accordance with one embodiment, simulation engine 106 may be executed by the processor 102 to cause graphical objects 108 to be rendered on the display 104. Depending on implementation, the simulation engine 106 may for example construct one or more graphical objects from simple or complex particles (P200). The particles, in collaboration, approximate the graphical representation of a graphical object 108, desirably in a uniform manner. As such, the simulation engine 106 may be used to render one or more constructed graphical objects 108 on the display 104 (P210).

In one embodiment, the simulation engine 106 may re-render a graphical object 108 periodically or partially in response to certain events, such as a collision. A collision refers to an interface between two graphical objects that may result in a change in the appearance or direction of movement of at least one of the graphical objects. In an exemplary embodiment, a graphical object 108 may be rendered on the display 104 in the context of a collision detection geometry defined based on the positioning of a number of three dimensional particles that make up the graphical object. In addition, a rendering geometry may be utilized to define a triangulated surface for the collection of three dimensional particles that make up the graphical object 108.

Three dimensional particles that make up the graphical object 108 may have any three-dimensional shape (e.g., a cube, a sphere, etc.). In one implementation, a collision grid may be implemented to allow the simulation engine 106 to detect a collision or a potential collision between particles that make up graphical objects that are about to collide. The collision grid may be implemented as a table, array, vector, or other data structure. A collision may be detected if at least two particles in different graphical objects are located in a predetermined proximity of each other on the collision grid.

The simulation engine 106, in one embodiment, uses the collision grid to detect a collision within a simple particle context (P220). That is, the simulation engine 106 may use the collision grid to determine whether there are any potential collisions between at least a first particle in a first object and a second particle in a second object, based on particle attributes that define three degrees of freedom for the colliding particles. Upon detecting a potential collision, the simulation engine 106 performs a distance computation (e.g., a simple Euclidean calculation) to determine whether a collision is imminent (i.e., actual collision).

Figure 3:
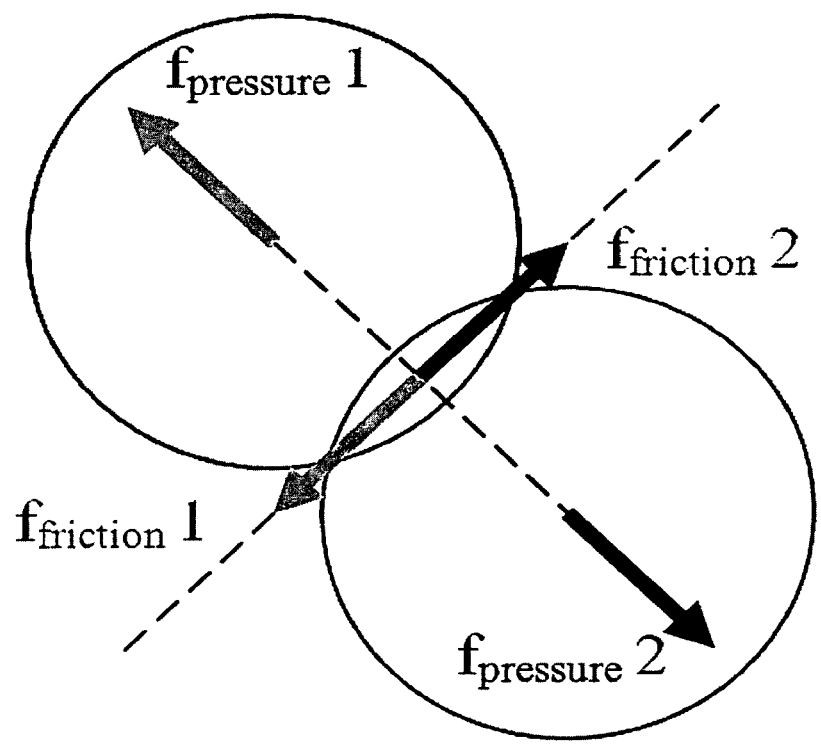
FIG. 3 illustrates calculation of forces for two colliding particles, in accordance with one embodiment.

Referring to FIG. 3, in response to determining that a potential collision is an actual collision, the simulation engine 106 computes forces applied to the particles involved in the collision based on various factors (e.g., velocity, pressure, friction, etc.) associated with the particles. In one implementation, the simulation engine 106 computes pressure or friction forces operating on the involved particles, within a simple particle context as provided in further detail below (P230).

According to one implementation, in the simple particle context, the complex particles in a graphical object are treated or reduced to simple particles by for example ignoring spatial properties of the complex particles (e.g., rotation attributes) that are not applicable to simple particles. Since the computation of attributes (e.g., pressure and friction forces) associated with simple particles is simpler than computation of attributes for a complex particle, a more efficient processing environment may be maintained when the forces applied to the complex particles are computed within a simple particle context (i.e., based on attributes associated with three degrees of freedom, as opposed to six degrees of freedom).

In other words, since a simple particle has three degrees of freedom, in contrast to the six degrees of freedom of a complex particle, the result of a collision within the simple particle context may be computed more efficiently. In one embodiment, the simulation engine 106 may compute the forces applied to the colliding objects also at a complex particle context (P240). Computation of forces applied to complex particles may be performed by, for example, computing torque and linear forces applied to a complex particle. That is, the torque and linear forces associated with the complex particles in a graphical object may be used to compute the change in linear and angular velocities of the graphical object.

In one embodiment, the simulation engine 106 computes the new position and orientation of graphical objects that comprise the complex particles based on the change in the corresponding linear and angular velocities (i.e., integrated velocities) of the complex particles (P250). In one implementation, the simulation engine 106 may also update the collision grid if the complex particles or graphical objects are in motion (P260). The simulation engine 106 may also update the collision grid, if the complex particles or graphical objects move between grid cells.

Referring to FIGS. 4A through 4D, in accordance with one embodiment, the above disclosed computations may be implemented in form of exemplary pseudo codes as provided in further detail below. A complex particle may have one or more attributes including, without limitation, position, velocity, acceleration, angular position, angular velocity and angular acceleration. Other particle attributes and parameters may be defined to indicate the number of particles in a graphical object, the particles shape (e.g., sphere) or radius, for example.

A simple particle may be also associated with a position, a velocity, an acceleration, and a complex particle (e.g., an owner particle which includes the simple particle), as shown in FIG. 4B, for example. Collision detection, force computation, particle integration and grid updates may be implemented using a continuous loop, as shown in FIG. 4C, for example. Integration of a particle may be achieved by computing angular inertia and acceleration, and updating the velocity of simple particles that define a complex particle, as shown in FIG. 4D, for example.

It is noteworthy that, in one embodiment, the above provided processes may be executed by one or more processors capable of multitasking (e.g., a Larrabee or Intel multi core processor). In such an embodiment, a simple particle may be analyzed for collisions independently of other simple particles to enable thread-level parallelism with respect to simple particles. Also, accumulation or integration for a complex particle may be performed independent of other complex particles to enable thread-level parallelism with respect to complex particles.

In one embodiment, the computing system 100 may comprise a vector processor. A vector processor refers to a processor capable of executing single instruction multiple data (SIMD) instructions. A vector processor may be a multiprocessor that supports parallel processing of data loaded into multiple vector registers. In such an embodiment, the simulation engine 106 may compute force, velocity or position of a simple particle independently of other simple particles to enable data-level parallelism.

Figure 5:
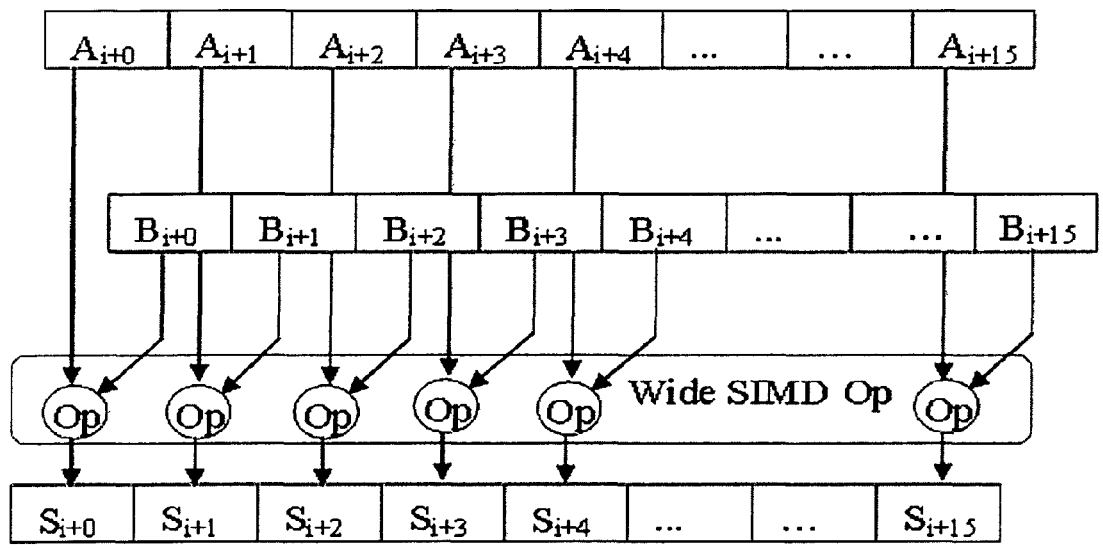
FIG. 5 illustrates a block diagram of an exemplary mechanism for updating the velocities of a set of simple particles using a vector processor, in accordance with one embodiment.

Referring to FIG. 5, a vector processor may be used to, for example, update the velocity of a particle after a collision. For the purpose of illustration, assume that there are 16 particles. In the simple particle context, the velocity of one or more particles prior to the collision may be loaded into vector registers $A_{i+0}, A_{i+2}, \ldots A_{i+15}$, respectively, and the change in velocity of one or more particles may be loaded into vector registers $B_{i+0}, B_{i+2}, \ldots B_{i+15}$, respectively. Once the previous velocities and changes in velocities are loaded, a computing operation (e.g., a wide SIMD operation) may be performed to compute the velocity of the simple particles after the collision. The velocity of the simple particles after the collision may be stored in vector registers $S_{i+0}, S_{i+2}, \ldots S_{i+15}$, respectively, for example.

Graphical object simulation using complex particles, as noted above, provides fast physical interaction between objects, including deformable objects and crashing objects, with lower cost and higher scalability, due in part to the multi-stage calculation of forces as applied to simple and complex particles. Desirably, a computation is preliminarily performed on a narrow set of graphical objects (e.g., at the simple particle context) to determine the collision proximity according to a collision grid. In such computation, forces are computed with relatively low computational overhead.

For example, when two potentially colliding graphical objects are symmetric and within a predetermined distance or predetermined number of particles on the collision grid, the forces applied to the graphical objects may be derived from computing forces applied to the particles that make up the objects. Depending on implementation, integration of complex particles involves a single iteration to resolve a collision. Further, consideration of friction force, in addition to other forces, prevents graphical objects from jittering or spreading.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

The invention claimed is:

1. A computer implemented method for simulating movement of a graphical object in a multidimensional virtual space, the method comprising:
    detecting an interaction of the graphical object with another object as a result of the simulated movement as a simple particle interaction, the graphical object being constructed from simple and complex particles;
    computing a first set of forces associated with the simple particles of the graphical object due to the interaction if a simple particle interaction is detected, the simple particle forces being related only to three degrees of particle motion freedom;
    computing a second set of forces associated with the complex particles of the graphical object due to the interaction if a simple particle interaction is detected, the complex particle forces being related also to additional degrees of particle motion freedom;
    computing position and orientation of particles in the graphical object after the interaction, based on computation results for the first set of forces and the second set of forces; and
    rendering the graphical object for a user using the computed position and orientation.

2. The method of claim 1, wherein the another object is a second graphical object and wherein relative position of the first graphical object and the second graphical object after the interaction is determined based on the position and orientation computed for the particles in the first graphical object and the second graphical object after the interaction.

3. The method of claim 1, wherein a collision grid is used to determine that there is an interaction when a simple particle of the first graphical object is within a predetermined proximity of a simple particle of the another object on the collision grid.

4. The method of claim 1, wherein the first set of forces are calculated based on pressure and friction attributes associated with the simple particles.

5. The method of claim 1, wherein the second set of forces are calculated based on torque and linear force attributes associated with the complex particles.

6. The method of claim 5, wherein the second set of forces is used to compute changes in linear and angular velocities of the simple particles due to the interaction.

7. The method of claim 6, wherein the change in linear and angular velocities of the simple particles are used to compute the position and orientation of the graphical object after the interaction.

8. The method of claim 1, wherein the simple particles are processed independently of each other.

9. The method of claim 1, wherein thread-level parallelism is enabled by a multiprocessor when computing at least one of the first or the second set of forces.

10. The method of claim 1, wherein data-level parallelism is enabled by a vector processor when computing at least one of the first or the second set of forces.

11. A system for simulating a graphical object in a multi-dimensional virtual space, the system comprising:
    a logic unit of a vector processor to detect an interaction of the graphical object with another object as a result of the simulated movement as a simple particle interaction, the graphical object being constructed from simple and complex particles;
    a logic unit of the vector processor to compute a first set of forces associated with the simple particles of the graphical object due to the interaction if a simple particle interaction is detected, the simple particle forces being related only to three degrees of particle motion freedom;
    a logic unit of the vector processor to compute a second set of forces associated with the complex particles of the graphical object due to the interaction if a simple particle interaction is detected, the complex particle forces being related also to additional degrees of particle motion freedom;
    a logic unit of the vector processor to compute position and orientation of particles in the graphical object after the interaction, based on computation results for the first set of forces and the second set of forces; and
    a plurality of vector registers to store the computed position and orientation.

12. The system of claim 11, wherein the another object is a second graphical object and wherein relative position of the first graphical object and the second graphical object after the interaction is determined based on the position and orientation computed for the particles in the first graphical object and the second graphical object after the interaction.

13. The system of claim 11, wherein a collision grid is used to determine that there is an interaction when a simple particle of the first graphical object is within a predetermined proximity of a simple particle of the another object on the collision grid.

14. The system of claim 11, wherein the first set of forces are calculated based on pressure and friction attributes associated with the simple particles.

15. The system of claim 11, wherein the second set of forces are calculated based on torque and linear force attributes associated with the complex particles.

16. An apparatus for simulating a graphical object in a multi-dimensional virtual space, the apparatus comprising:
    means for detecting an interaction of the graphical object with another object as a result of the simulated movement as a simple particle interaction, the graphical object being constructed from simple and complex particles;
    means for computing a first set of forces associated with the simple particles of the graphical object due to the interaction if a simple particle interaction is detected, the simple particle forces being related only to three degrees of particle motion freedom;
    means for computing a second set of forces associated with the complex particles due to the interaction if a simple particle interaction is detected, the complex particle forces being related also to additional degrees of particle motion freedom;
    means for computing position and orientation of particles in the graphical object after the interaction, based on computation results for the first set of forces and the second set of forces; and
    means for rendering the graphical object for a user using the computed position and orientation.

17. The apparatus of claim 16, wherein the another object is a second graphical object and wherein relative position of the first graphical object and the second graphical object after the interaction is determined based on the position and orientation computed for the particles in the first graphical object and the second graphical object after the interaction.

18. The apparatus of claim 16, wherein a collision grid is used to determine that there is an interaction when a simple particle of the first graphical object is within a predetermined proximity of a simple particle of the another object on the collision grid.

19. The apparatus of claim 16, wherein the first set of forces are calculated based on pressure and friction attributes associated with the simple particles.

20. The apparatus of claim 16, wherein the second set of forces are calculated based on torque and linear force attributes associated with the complex particles.

* * * * *